Feb. 13, 1962 W. H. CARPENTER 3,020,732
APPARATUS FOR FREEZING COMESTIBLES
Filed Oct. 30, 1958 5 Sheets-Sheet 1
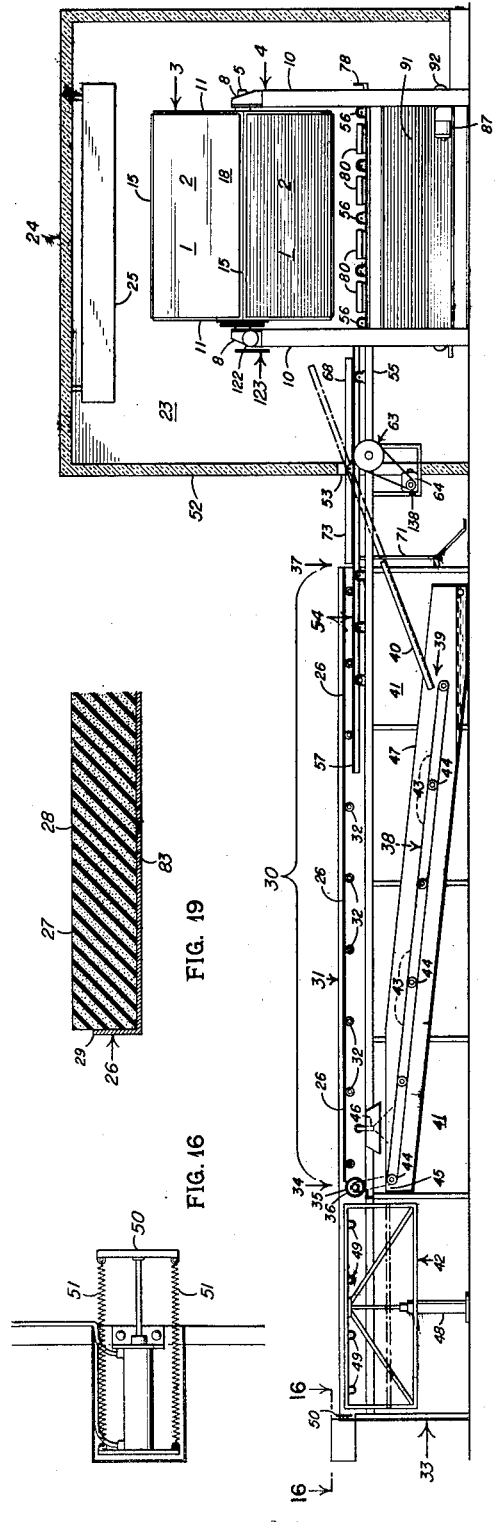
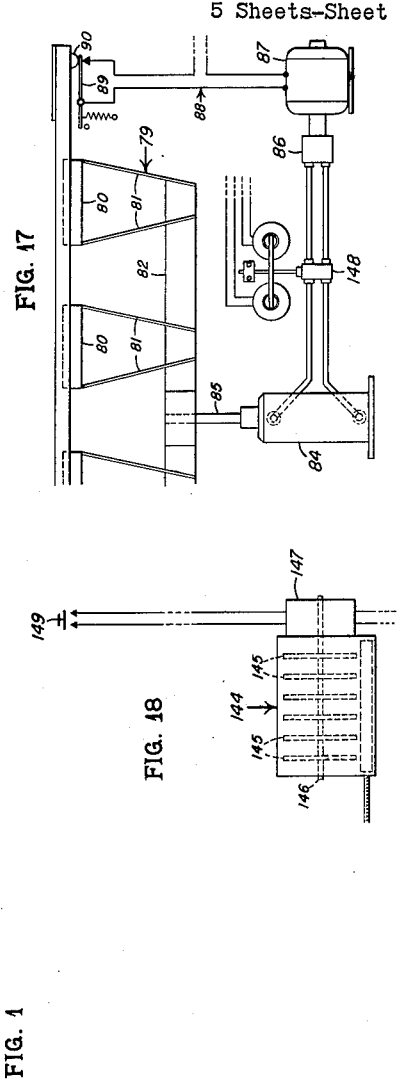
Inventor:
Walter H. Carpenter
By Wilmer Mechlin
his Attorney

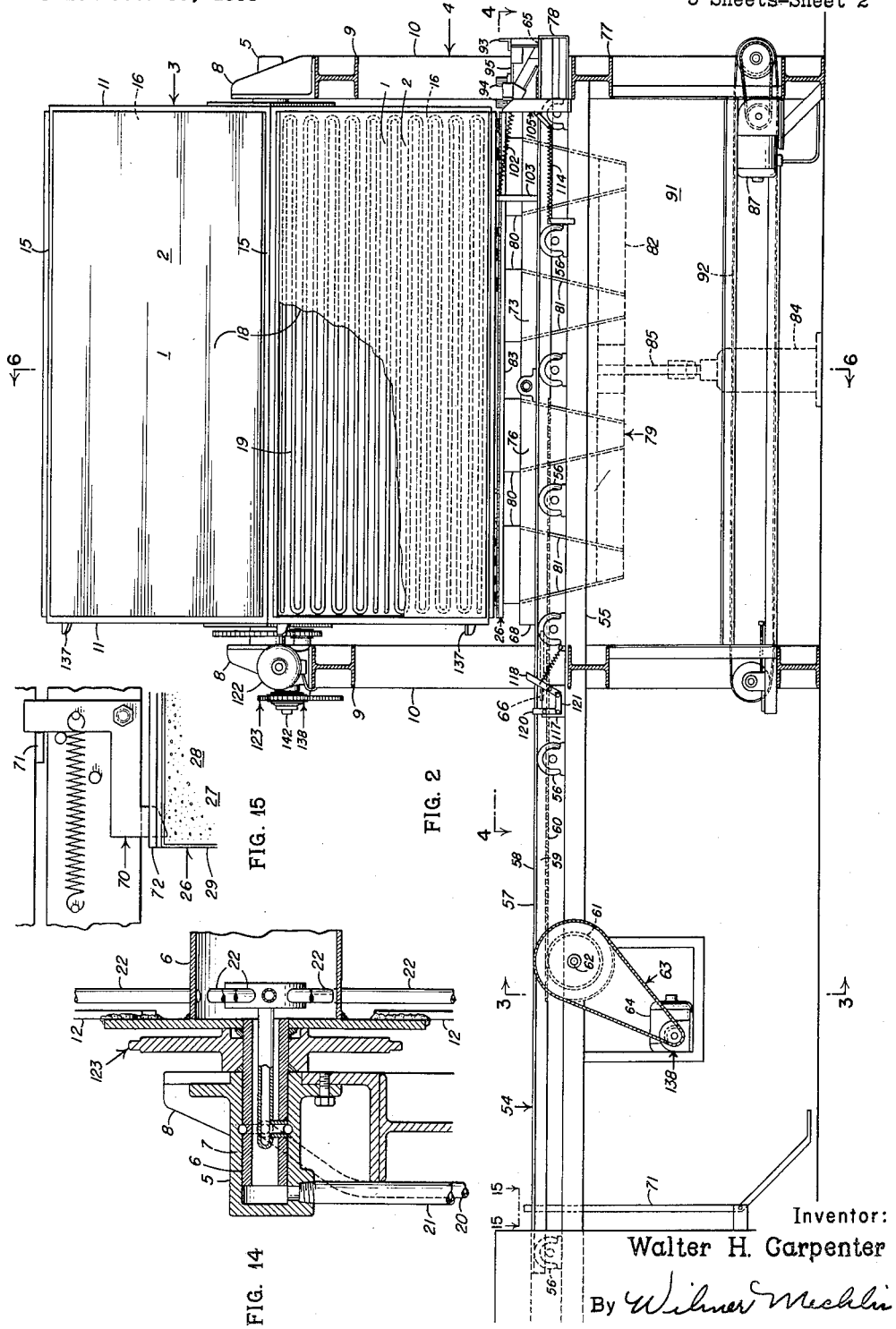

Feb. 13, 1962 W. H. CARPENTER 3,020,732
APPARATUS FOR FREEZING COMESTIBLES
Filed Oct. 30, 1958 5 Sheets-Sheet 3
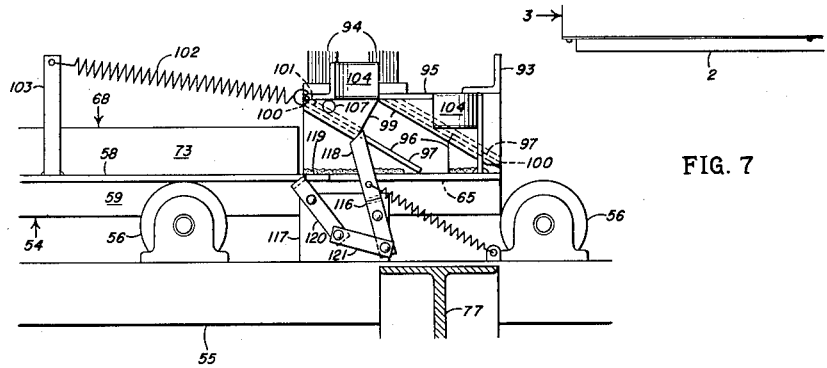
FIG. 7
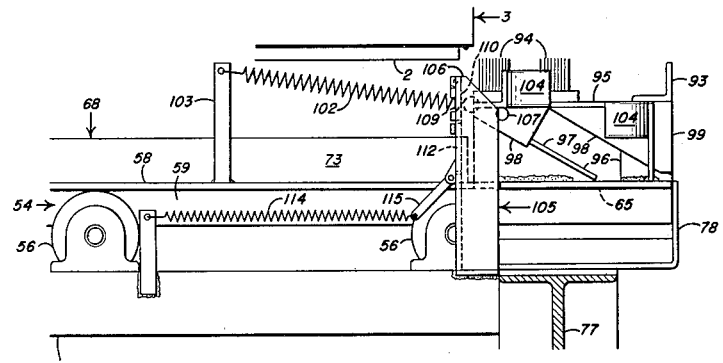
FIG. 8
FIG. 11
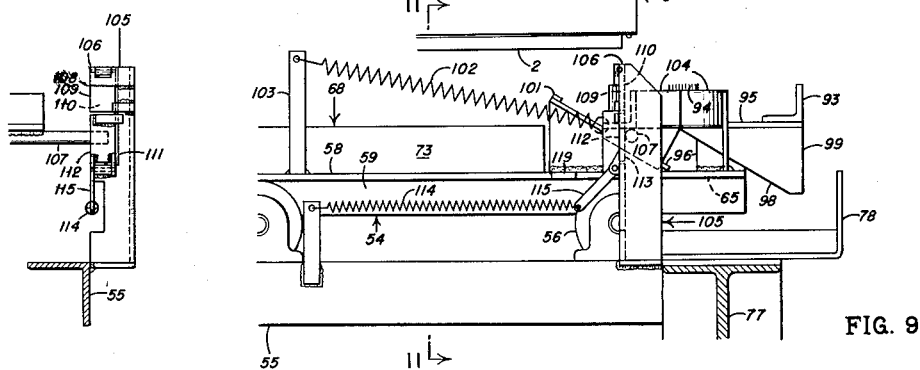
FIG. 9
FIG. 10
Inventor:
Walter H. Carpenter
By Wilmer Mecklin
his Attorney Feb. 13, 1962 W. H. CARPENTER 3,020,732
APPARATUS FOR FREEZING COMESTIBLES
Filed Oct. 30, 1958 5 Sheets-Sheet 4

Inventor:
Walter H. Carpenter
By Wilmer Mechlin
his Attorney

Inventor:
Walter H. Carpenter
By Wilmer Mechlin
his Attorney

United States Patent Office 3,020,732
Patented Feb. 13, 1962

3,020,732
APPARATUS FOR FREEZING COMESTIBLES
Walter H. Carpenter, 4802 S. 19th Ave., Tampa, Fla.
Filed Oct. 30, 1958, Ser. No. 770,741
33 Claims. (Cl. 62—345)

This invention relates to apparatus for freezing comestibles.

Since the inception of the frozen food industry, it has been the practice to quick-freeze comestibles or foodstuffs by subjecting them either directly or in cartons in which they are prepackaged, to refrigerated air at temperatures ranging downward to around −20° F. While in home freezers, the refrigerated air is usually still, in industrial freezers it is generally forced through the freezing chamber for the greater efficiency of a moving than a still fluid heat transfer medium in dissipating the sensible and latent heat in the comestibles. Constantly changed, the forced moving air minimizes the moisture content of the freezing chamber and so inhibits depositing of an insulating blanket of frost on the comestibles themselves. However, the moving air, while minimizing frost deposits in the freezing chamber, also partially dehydrates the comestibles with attendant reduction in both quality and saleable weight and if, as is usually the case, the air moves in a closed circuit, the moisture taken up from the comestibles is deposited on the coils by which the air itself is refrigerated by the primary refrigerant, with consequent detriment to the efficiency of heat transfer at that point. As an attempted solution to the dehydration problem, resort has been had to packaging the comestibles prior to freezing, despite appreciation that the insulating properties of the interposed container would reduce the efficiency of heat transfer and correspondingly increase the length of the cycle and thus the expense of quick-freezing. Prepackaging also proved to have the further disadvantage that, while it maintained the saleable weight of the package, partial dehydration of the comestibles occurred nonetheless, with the removed moisture depositing as frost on the inside surface of the container and the comestibles.

The apparatus of my copending application, Ser. No. 642,478, filed on February 26, 1957, departs radically from the preconceptions of the frozen food industry as to the essentiality of movement in the surrounding air in, instead, individually quick-freezing comestibles in substantially still air on a surface of high thermal conductivity which is internally refrigerated to a temperature on the order of −40°–70° F. The air being still, dehydration of the comestibles is practically nil, with consequent retention of quality, as well as saleable weight, with the heat transfer between the comestibles and the primary refrigerant not through air but through the highly conductive surface with which the individual comestibles are in direct contact, the dissipation of sensible and latent heat from the comestibles is both rapid and efficient. In addition, there resides in the low temperatures to which the comestibles are exposed the advantage that at such temperatures, any moisture in the surrounding air condenses, not as ice but as snow or fluffy crystals, readily removable from the surface on which it is deposited. The apparatus of this application employs the basic concept of my earlier apparatus, but improves on the latter in a number of respects.

The primary object of the present invention therefore is to provide an improved apparatus for individually freezing comestibles on an internally refrigerated surface in substantially still air.

Another object of the invention is to provide an improved apparatus for individually freezing comestibles wherein the comestibles are caused to adhere during freezing to an internally refrigerated surface and the ambient air to which the comestibles are exposed during freezing not only is substantially still but is maintained during such exposure at a temperature below that at which any moisture will condense as ice.

An additional object of the invention is to provide apparatus for individually freezing comestibles in which the comestibles are individually adhered to and carried on an internally refrigerated surface through a refrigerating chamber and the substantially still air in the refrigerating chamber is maintained at a temperature below that at which any suspended moisture will condense as ice by the refrigerating action of the surface augmented by stationary refrigerating means mounted in the chamber.

A further object of the invention is to provide apparatus of the character just described wherein any frost deposited on the internally refrigerated surface during freezing is removed coincident with the removal of comestibles therefrom to inhibit insulation of subsequently applied comestibles from the surface by any intervening frost.

Another object of the invention is to provide apparatus for individually freezing comestibles which is automated to run through a cycle in which comestibles are presented and applied to an internally refrigerated surface, conducted on the surface through a substantially still air freezing compartment and, when frozen, removed from the surface for further treatment.

An additional object of the invention is to provide apparatus for individually freezing comestibles, the cycle of which, in freezing comestibles on an internally refrigerated surface, is automated by a cyclic control and the necessity for precision in the control is obviated by override control means ensuring that the proper phase relationship between the several relatively moving parts of the apparatus involved in the freezing is automatically maintained or restored, if, for overhaul or other reason, they are temporarily put out of phase.

A further object of the invention is to provide apparatus for individually freezing comestibles wherein the override control means by which the need for precision in the cyclic control is avoided includes for certain of the parts positive stop means for limiting its movement in a given cycle and limited torque means for positively moving the part into position against the stop means.

Another object of the invention is to provide apparatus for individually freezing comestibles wherein comestibles are presented and applied automatically to an internally refrigerated surface at a pressure sufficient to cause the comestibles individually to adhere to the surface and be carried thereon during freezing.

An additional object of the invention is to provide apparatus for individually freezing comestibles wherein comestibles are frozen on successively offered, substantially flat, internally refrigerated surfaces forming the sides of a multisided drum and are presented to each surface in a batch preloaded on a tray through which cushioned force is applied to cause the comestibles to adhere individually to the offered surface.

A further object of the invention is to provide apparatus for individually freezing comestibles in which the comestibles are presented for freezing on an internally refrigerated surface in batches on trays on which they are preloaded and the trays are transported from a loading zone to the freezing zone on a conveyor.

Another object of the invention is to provide apparatus for individually freezing comestibles on an internally refrigerated surface wherein the trays on which the comestibles are presented for freezing, travel on a feed conveyor through a loading zone to the freezing zone and the travel of the trays is so controlled as to coordinate arrival of a loaded tray at the freezing zone with removal therefrom of the empty tray of the preceding batch.

An additional object of the invention is to provide apparatus for individually freezing comestibles on an internally refrigerated surface in which the comestibles are presented in batches on trays for freezing on internally refrigerated surfaces and the feed conveyor has an associated return conveyor during travel over which an empty tray is sterilized before return to the feed conveyor.

A further object of the invention is to provide apparatus of the type just described for individually freezing comestibles wherein the empty trays are individually transferred from the return to the feed conveyor by elevating and pushing means coordinatable with the cycle of operations in the freezing zone to ensure arrival at the latter of a loaded tray as the preceding empty tray is discharged.

Another object of the invention is to provide apparatus for individually freezing comestibles by presenting them on trays to internally refrigerated surfaces wherein each tray has a resilient pad on which the comestibles are loaded as an aid in inhibiting injury to and distributing the pressure among the comestibles during pressing thereof against the offered internally refrigerated surface.

An additional object of the invention is to provide apparatus for individually freezing comestibles wherein reciprocable means by which a load of comestibles is presented for application to an internally refrigerated surface is effective on its advance stroke to remove a previously frozen load and any accumulated frost from the surface, without interfering with the newly-applied load on its retract stroke.

Other objects and advantages of the invention will appear hereinafter in the detailed description, be particularly pointed out in the appended claims and be illustrated in the accompanying drawings, in which:

FIGURE 1 is a side elevational view of a preferred embodiment of the freezing apparatus of the present invention with portions broken away and shown in section to more clearly illustrate certain of the details of construction;

FIGURE 2 is a side elevational view on an enlarged scale of the freezing drum and associated structure of the present invention with portions broken away and shown in section to more clearly illustrate certain of the details of construction;

FIGURES 7, 8, 9 and 10 are fragmentary side elevational views on the scale of FIGURE 2 showing the dispositions of the breaker bar and brush carrier at the front of the feed carriage, respectively, at the start and finish of the feed stroke of the carriage and at the start and finish of its return stroke;

FIGURE 11 is a fragmentary vertical sectional view taken along the lines 11—11 of FIGURE 9;

FIGURE 14 is a fragmentary vertical sectional view on an enlarged scale taken along the lines 14—14 of FIGURE 3;

FIGURE 15 is a fragmentary plan view on an enlarged scale taken along lines 15—15 of FIGURE 2;

FIGURE 16 is a horizontal sectional view on an enlarged scale taken along the lines 16—16 of FIGURE 1;

FIGURE 17 is a view on the scale of FIGURE 2 showing fragmentary and somewhat schematically the lifting frames and their actuating mechanism;

FIGURE 18 is a small schematic view of a cyclic control for the apparatus of FIGURE 1; and FIGURE 19 is a fragmentary cross sectional view on an enlarged scale of one of the trays.

Figures 3, 6, 12, 13:
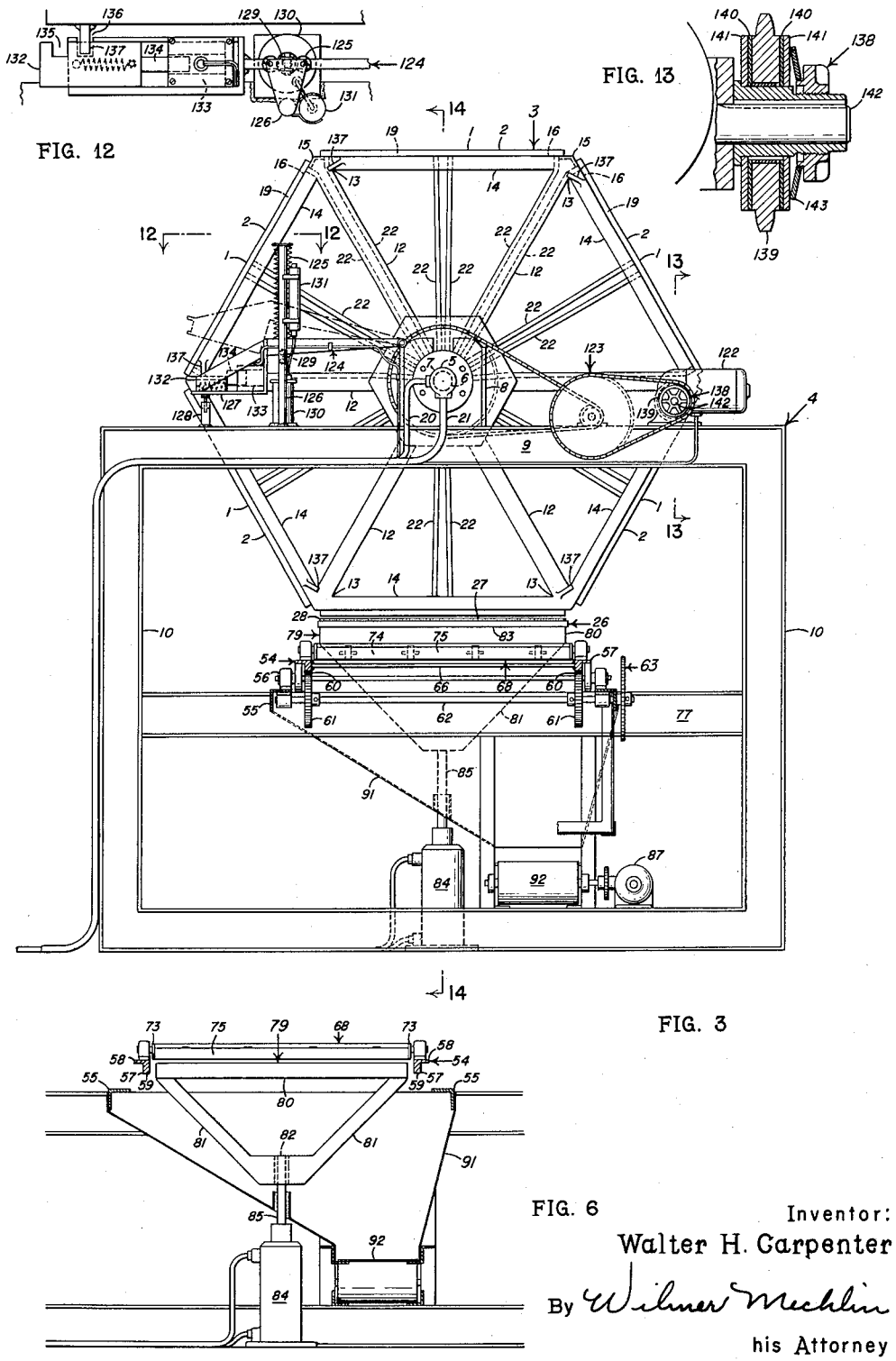
FIGURE 3 is a vertical sectional view taken along the lines 3—3 of FIGURE 2.
FIGURE 6 is a fragmentary vertical sectional view taken along the lines 6—6 of FIGURE 2, showing the feed carriage in down position.
FIGURE 12 is a fragmentary horizontal sectional view on an enlarged scale taken along the lines 12—12 of FIGURE 3.
FIGURE 13 is a fragmentary horizontal sectional view on an enlarged scale taken along the lines 13—13 of FIGURE 3.

Referring now in detail to the drawings, in which like reference characters designate like parts, the improved comestible-freezing apparatus of the present invention is applicable for freezing, either intermittently or continuously and with practically no loss in quality or weight, any comestible which is adapted for quick freezing and may be applied to a cold surface so as to freeze or adhere thereto by freezing of its surface moisture with a bond of sufficient force to hold it to the surface as the latter moves through a freezing zone. As does that of my copending application, Serial No. 642,478, the apparatus of this invention depends on internal refrigeration to chill the surface to which the comestibles are applied and since requiring individual bonding of the comestibles to the surface, restricts the quantity of comestibles applicable to the surface to that containable in a layer of single thickness, with consequent uniformity in freezing. However, unlike the earlier apparatus, that of this invention not only automatically removes but as well automatically applies comestibles to the surface on which they are frozen, with consequent safeguarding of operators and increase in its capacity.

Embodying basically an internally refrigerated, thermally conductive surface to which comestibles to be frozen will individually freeze, adhere or bond, a freezing zone or chamber containing substantially still refrigerated air or other atmosphere, means for moving the surface through that zone without appreciable agitation of the refrigerated ambient atmosphere, and means for automatically applying and removing comestibles to and from the surface, the apparatus of the embodiment illustrated as exemplary of the invention may have one but preferably has a plurality or, more exactly, a multiplicity of internally refrigerated or chilled surfaces 1, each forming an outer face of one of the several sides or side walls 2 of a hexagonal or other plural or multi-sided drum 3.

As shown particularly in FIGURES 2 and 3, the illustrated drum 3 is rotatably mounted or supported on a weldment or other suitable stand or supporting frame 4 with the journals 5 at opposite ends of its shaft or axle 6 journalled or rotatable in bearings 7, each removably secured to an upright or bearing plate 8 rigid with and upstanding from the top crosspiece 9 of one of the end members 10 of the stand 4. Conveniently of skeletonized or openwork welded construction, the drum 3 has each of its axially spaced opposite ends 11 formed of a plurality of spokes or arms 12 radiating from its shaft 6 and connected or fixed at their outer ends to the junctures 13 of a plurality of transversely extending, peripheral, end-connected webs 14, together forming the rim of the drum, the ends 11 being connected to each other by ribs 15 extending longitudinally between the corresponding junctures of their peripheral webs. Its open-framework construction providing a plurality of substantially rectangular openings 16, each bounded longitudinally by an adjoining pair of the ribs 15 and transversely or laterally by a confronting or corresponding pair of the webs 14, the drum 3 has its side walls 2 formed of a plurality of hollow side panels, each seating in one of the openings 16 and bolted or otherwise removably secured to the bounding ribs and webs.

At least the outer side sheets 18 of the panels 2 carrying the outer surfaces 1 are formed of stainless steel or like material, combining non-corrosiveness and ready cleansability with good heat conductivity and the outer surfaces may be internally refrigerated or chilled by admitting Freon or other primary refrigerant directly into, the hollow interiors of the panels. However, for better control, it is preferable to conduct the primary refrigerant through the several panels 2 in cooling or chilling coils 19 and for the relatively large panels of the illustrated embodiment to employ two such coils per panel, the coils in either case desirably being so mounted within the panels as to have direct contact with the outer side sheets so as to dissipate or transfer the sensible and latent heat of the comestibles being frozen by conduction between the outer surfaces 1 and the refrigerant.

To enable the refrigerant to pass through the cooling coils 19, whether the drum 3 is rotating or idle, either one or, in view of the number of coils, preferably both of the journals or stub axles 5 at the ends of the shaft 6 are hollow, as is the preferred shaft. In the preferred construction appearing in FIGURE 14 each of the journals 5 is provided with a pair of separate passages (not shown), each having a conventional sealed swivel connection through the associated bearing 7, one to the feed piping 20 from and the other to the return piping 21 to a compressor (not shown). In turn, the leads 22 within the drum 3 to the several coils 19 are appropriately connected through the shaft 6 to one or the other of these passages, the leads here being divided equally between the journals.

Instead of being constructed in the above manner, the drum 3 may have as its internally refrigerated surface 1 a continuous cylindrical surface, such as that of my abovementioned copending application. In such case, the drum may be rotated continuously during operation of the apparatus and comestibles suited to such handling may be applied automatically and continuously to the rotating surface, as it presents itself, by a gravity or other positive feed, with either gravity or other force supplying the pressure required at the temperature of the surface to bond the comestibles thereto. However, automatic batch loading, even though requiring intermittent rotation to cause the drum to dwell for the interval necessary for loading, generally is more advantageous and it is for such loading that the illustrated apparatus is particularly designed.

Whether adapted for the preferred batch or continuous automatic loading, the drum 3, either alone or preferably with its stand and associated structure, is contained, confined or housed in a freezing chamber, compartment or cell 23 constituting or defining the freezing zone of the apparatus and in turn contained or confined by a housing, casing or shell 24 which, if, as in FIGURE 1, built on ground level, need only be insulated at top and sides. Consistent with the size of the illustrated drum 3, the chamber 23 may be of walk-in dimensions to facilitate inspection and repair of the drum and associated machinery. Usually air, the gaseous medium or atmosphere in the freezing chamber 23 surrounding or ambient the drum 3 is protected by the housing 24 from outside forces tending to move it and the movement of the drum itself, somewhere around one revolution every six minutes, depending on the nature of the comestibles being frozen, is too slow to be sufficient to cause appreciable agitation.

The stillness of the atmosphere in the freezing chamber 23 solves one problem, in reducing to an absolute minimum dehydration of the comestibles and consequent loss in their quality and weight. But it poses another, since moisture condenses more rapidly from still than moving air and it is impractical to seal the freezing chamber against entry of some moisture-containing, outside air. While condensation of such moisture cannot be prevented, it can be and preferably is controlled so that any condensed moisture or frost will have no detrimental effect on the freezing of the comestibles, by maintaining the surrounding air at a temperature at which the moisture will condense as snow or fluffy crystals rather than as ice. The critical temperature below which moisture will condense as snow rather than as ice from still air at atmospheric pressure is on the order of $-35°$ F., and it therefore is at the temperatures in the range below this critical temperature that the air in the freezing chamber 23 is intended to be maintained. How this is accomplished depends on the size of the freezing chamber 23 relative to that of the drum 3. If the size differential is held at a minimum so that the chamber holds only the drum itself, the latter's cooling coils 19 will suffice. This is particularly so if the cascade system of cooling is employed in which the primary refrigerant flowing through the cooling coils 19 is a low-boiling refrigerant such as Freon 22, a secondary-boiling refrigerant such as Freon 12 is used as the coolant for the primary refrigerant and the secondary refrigerant in turn is cooled by water as the tertiary refrigerant or cooling agent, this system enabling the temperature of the drum surface 1 to be maintained at least as low as about $-70°$ F. with a lesser but adequate reduction in the temperature of the surrounding air to around $-50°$ F. or lower. However, if the size differential is rather large, as in the disclosed embodiment, it is desirable to augment or supplement the refrigerating or chilling effect of the cooling coils 19 in the drum on the surrounding air by cooling coils or plates 25 mounted stationarily in the freezing chamber 23 and, like the coils 19 in the drum, cooled by the cascade system, one or banks of so-called "Dole" plates being particularly suited for the purpose.

In maintaining the temperature of the air in the refrigerating chamber 23 below the critical temperature so that any accumulated frost will be in the form of readily brush-offable snow, the drum surfaces 1 and the supplementary or auxiliary stationary cooling means 25 ordinarily will be held at approximately the same temperature so that the division of the frost between them will be substantially in the ratio of their exposed surface areas. However, the relative affinity of the frost for either of these chilling media may readily be increased by reducing its temperature considerably below that of the other, so that the latter will remain substantially frost-free. Thus, by applying the relative reduction in temperature to the drum surfaces 1 and depending on the automatic means, hereinafter to be described, for removing any accumulated frost therefrom, the supplementary cooling means 25, without attention, may be caused to operate at maximum efficiency over an extended period.

For the batch loading for which the illustrated drum 3 is designed, the several internally refrigerated surfaces 1 preferably are substantially flat or planar and adapted to be offered or presented in sequence or successively by intermittent rotation of the drum, each to one of a plurality of correspondingly flat trays or pans 26, each of substantially the shape and surface area of each of the several uniform surfaces and preloaded with the batch or quantity of comestibles to be applied to the offered surface. Made of stainless steel, suitable plastic or other non-corrosive material, each tray preferably carries on its upper surface 27 a pad or cushion 28 of sponge rubber or other material of like resilience, which preferably is coated or otherwise treated to render it impervious to moisture and is substantially coextensive with the tray, the pad being either bonded to the tray or, as here, held in place by an encircling or engirdling upturned peripheral flange 29 of lesser height on the tray.

In the illustrated embodiment, each of the trays 26 is designed to be preloaded, either manually or mechanically at a loading zone or station 30 along and forming part or, as here, the whole of a feed conveyor 31 on which the tray travels or is moved toward the drum 3. Since the illustrated drum must intermittently rotate or dwell or pause in its rotation to enable each of its several side surfaces 1 to be batch loaded, the movement of the trays on the feed conveyor 31 should also be intermittent. This is here accomplished by supporting the trays 26 over the loading zone 30 on idler rollers 32 journalled at the ends in a supporting stand or frame 33, making the length of the loading zone that of one tray or a multiple thereof and providing at the inlet or feed end 34 of the loading zone a suitably driven drive roll or roller 35, preferably having a rubber or like non-skid coating or surface 36 for driving a tray onto the idle rollers. With this arrangement, it is only necessary that the loading zone have its full complement of trays for the movement of an additional tray into that zone by the drive roll 35 to move each tray one length forward and displace or discharge the far tray from the outlet or discharge end 37 of the loading zone. The illustrated loading zone is of a length to hold three of the trays, such length, while more than adequate for mechanical loading, being desirable to accommodate the manpower needed to load the trays manually at a rate to meet the demands of the drum 3 at maximum output.

The conveyor stand 33, illustrated particularly in FIGURE 1, supports not only the feed conveyor 31 but also, in underlying relation thereto, a return conveyor 38 for returning empty trays from the freezing zone 23 to the loading zone 30. Accessible at its inlet end 39 to any of the trays discharged from the freezing zone 23 conveniently through a pair of guideway- or slideway-forming angle iron or like guides or slides 40 secured, parallelly, to the opposite sides 41 of the conveyor stand 33, below and sloping or inclining away from the discharge end 37 of the loading zone 30, the return conveyor 38 here runs upwardly therebeyond to deliver each empty tray to an elevator 42 disposed or mounted in the stand 33 in advance of the drive roll 35 of the feed conveyor 31. Designed to drive a tray along its length, here on belts 43 drivably connecting a plurality of longitudinally spaced rollers 44, the one of which at the outlet end 45 of the return conveyor 38 may be driven off the drive roll 35, the return conveyor additionally is designed to present the empty trays for sterilizing prior to reloading. This is here accomplished by disposing, above the return conveyor 38 adjacent its outlet end 45, a hooded sprayer 46 for spraying chlorinated water or like disinfectant on each empty tray as it passes thereunder and containing the return conveyor in an open-topped trough or sump 47 for catching the run-off from the trays.

Shiftable vertically between the level of the feed conveyor 31 and that of the outlet end 45 of the return conveyor 38 by a fluid pressure-actuated elevating piston 48 or other suitable raising and lowering means, the elevator 42 normally is in its lower position and preferably is floored by idler rollers 49 to facilitate depositing on it of an empty tray by the return conveyor 38, the empty tray is lifted to the level of the feed conveyor 31 and then given a push or kick sufficient to engage it with the drive roll 35 so as to drive it off the elevator into the loading zone 30 of the feed conveyor 31. The desired push here is given the tray by a normally spring-retracted, horizontally reciprocable fluid pressure or otherwise suitably actuated pusher or pusher piston 50 mounted at the outer end of the conveyor stand at the opposite side of the elevator 42 from the drive roll 35. Controllable either separately or with the drum 3 and its associated mechanisms, the actions of the elevator 42 and the pusher 50 preferably are so synchronized that the forward stroke of the pusher will follow raising and its retract stroke precede lowering of the elevator. This is readily accomplishable for the illustrated fluid-pressure-actuated pistons through a common control valve (not shown) by connecting the pistons in parallel off the valve and making the pusher piston 50 of such small size relative to the elevating piston 48 that the force exerted on the latter by its return springs 51 will effectively retard its advance and speed its retraction. To protect the elevator 42 and other mechanisms associated with the feed and return conveyors 31 and 38, as well as for the safety of the operating personnel, the conveyor stand 33 and its mechanisms, in operating condition, normally will be closed or covered at the sides and front by stainless steel or other suitable sheeting or paneling, as indicated at 41 in FIGURE 1.

The conveyor stand 33 terminating short of the contiguous wall 52 of the housing 24 containing the drum 3, movement or transportation of a tray therebeyond to and from a position confronting one of the side surfaces 1 on the drum through an appropriate inlet opening or slot 53 in the wall, devolves upon or is a function of a carriage 54 riding, rolling, or otherwise supported and reciprocable on a trackway formed by a pair of transversely spaced parallel main rails or tracks 55 which connect and are fixed or secured to or rigid with the conveyor and drum frames 33 and 4. Substantially horizontally disposed below the levels of the feed conveyor 31 and the drum 3, the main rails extend rearwardly either into or for the length of the conveyor stand 33 and forwardly to the front, far or remote end member 10 of the drum frame 4. Normally seating on the main rails 55 intermediate the adjacent or contiguous ends of the conveyor and drum frames 33 and 4, the carriage 54 is adapted to ride on the main rails, either on its own wheels or, as here, on a plurality of longitudinally spaced, transversely aligned pairs of anti-friction rollers or roller bearings 56, one of each pair being mounted on each of the rails. As will be seen in FIGURES 2 and 4, the preferred carriage is substantially rectangular in outline and conveniently has as its side members or side rails 57 a pair of parallel, transversely or laterally spaced angle irons, the outstanding top or horizontally directed flanges 58 of which ride on the anti-friction rollers 56 on the main rails 55 and the depending vertically directed flanges 59 of which are toothed, as at 60, to serve as racks, each engageable with one of a pair of pinions 61 mounted on a common shaft 62 and drivable through suitable drive gearing 63 by a reversible drive motor 64 for reciprocating or reciprocably driving the carriage. The side members or irons 57 are connected at their front ends by a front end or cross tie, plate or member 65, here, extending between and coplanar with their top flanges 58 and secured as by welding thereto and intermediate their ends by a correspondingly secured rear cross tie or tie plate 66.

The front and rear cross members 65 and 66 and the side members 57 of the carriage 54 together define a central opening 67 in the carriage, over which fits or seats a tiltable platform 68 pivotally mounted at the sides, rearwardly of its center of gravity, on the side rails 57 for tilting, swinging or pivoting longitudinally relative to the carriage about a transverse axis. Eccentrically pivoted, the platform 68 is permanently restrained from swinging downwardly at the front by underlying stop fingers 69 instanding from the side rails 57. The platform 68, also, normally is locked against rearward tilting. However, such locking is made releasable, when the carriage 54 is in its normal position between the conveyor and drum frames 33 and 4, by providing a spring-pressed latch 70 carried by one of the side rails 57 and normally underlying the platform at the rear but swingable, retractable or trippable, with the carriage in normal position, by a treadle-actuated trip bar 71 mounted on the conveyor frame, so that the platform can then be tilted rearwardly to align it with the guideway 40 leading to the return conveyor 38. Restoring of the platform 68 to normal horizontal position after tilting simply is a matter of releasing the platform so that its forward overbalance can come into play, after which the pressure on the trip bar 71 is released to again lock the platform against tilting.

The tiltable platform 68 has a rectangular frame 72, the transversely spaced side pieces or sides 73 of which are connected intermediate their ends by a plurality of transversely extending, roller-carrying cross pieces or plates 74 spaced longitudinally from each other and the platform's front and rear ends, end pieces or members 75 and the front and sides of which are surmounted by an upstanding, rearwardly opening, U-shaped railing or lip 76. With its floor-forming cross pieces 74 normally substantially at the level of the adjacent end of the feed conveyor 31 and its railing 76 open at the rear, the tiltable platform 68 in the normal position of the carriage 54 is disposed or in position to receive a loaded tray as the latter is driven off the feed conveyor and by its railing to center the tray relative to the platform and carriage and to the internally refrigerated surface 1 on the drum 3 which it will later confront. Sequentially, after the comestibles have been transferred from a loaded tray to the surface on the drum, the platform, when tilted on return of the carriage to normal position, will discharge the empty tray over the trackway 40 onto the return conveyor 38.

With the main rails 55 on which the carriage 54 rides parallelling and disposed equidistantly on opposite sides of the rotative axis of the drum 3, a tray 26 will automatically be aligned or centered laterally on the offered chilling surface 1 on the drum as it is moved forward by the carriage. Longitudinal alignment or centering of the tray and offered surface also is assured by attaching to the main rails 55 or, more preferably, to an intermediate cross-beam 77 of the outer or far end member 10 of the drum frame 4 a pair of bumper or stop brackets 78, disposed to engage the front end plates 65 of and stop, limit or determine the extent of forward or advance movement of the carriage 54.

Moist on their surfaces after previous treatment when introduced into the refrigerating chamber 23 and with the temperature of the internally refrigerated surfaces 1 so low as to freeze such surface moisture practically on contact, the comestibles will be bonded on application to the offered surface with the frozen moisture serving as the adhesive. However, since the strength of the bond will vary with the area of contact, the pressure required to obtain the firm bond here contemplated in turn will depend on the relative shape and conformability of the particular comestibles undergoing treatment, a pressure of 70–80 p.s.i. having been found suitable in the case of irregularly shaped and rather stiff comestibles, such as shrimp. In the illustrated embodiment, comestibles are applied from below to the offered surface of the drum, the vertical spacing between the main rails and drum being such that each tray, with its batch or load of comestibles, will be spaced below and thus clear the offered surface 1 when initially presented or brought into alignment or confronting relation therewith by the carriage 54. Accordingly, provision is here made for lifting, elevating or raising each loaded tray, as presented, and applying the comestibles thereon to the offered surface of the drum with the pressure or force required to cause them to freeze, bond or adhere firmly thereto.

Figure 4:
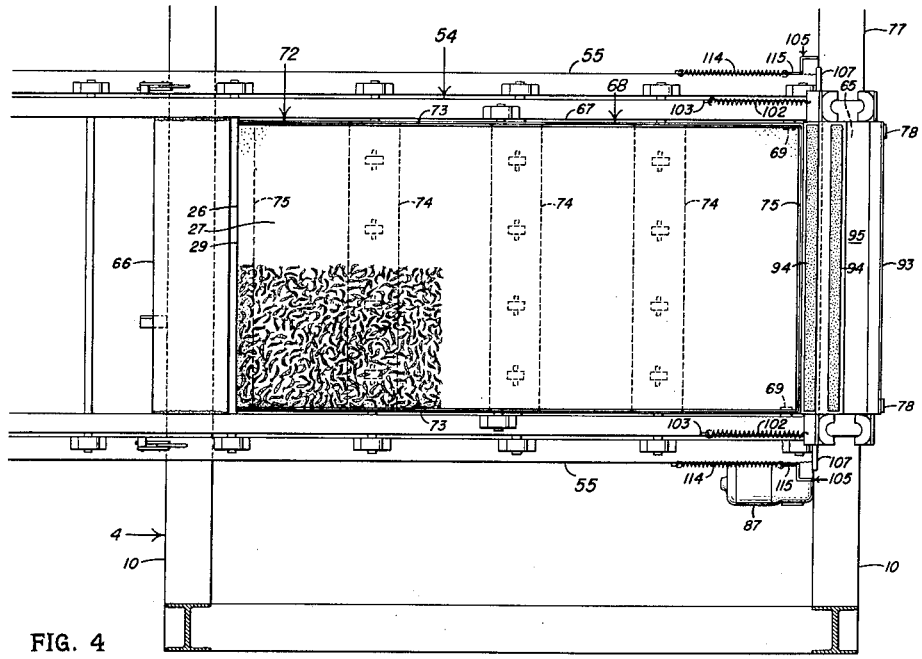
FIGURE 4 is a horizontal sectional view taken along the lines 4—4 of FIGURE 2.
Figure 5:
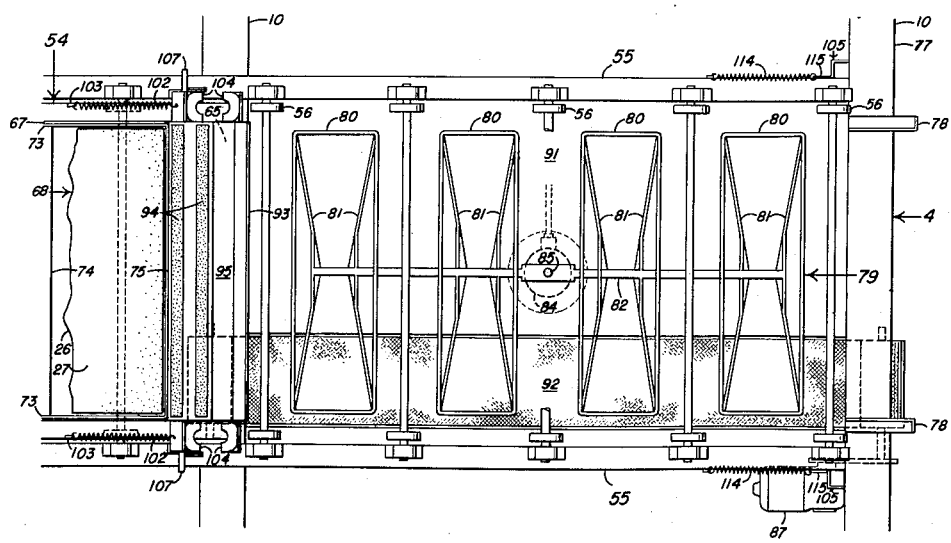
FIGURE 5 is a view taken on the same section as FIGURE 4 but with the feed carriage in retracted position.

The preferred lifting means, the details of which appear in FIGURES 4 and 5, are in the form of a plurality of lifting racks or frames 79, each having a substantially rectangular or box-shaped head or upper end portion 80 fittable or receivable between the longitudinally spaced cross and end pieces 74 and 75 of the platform 68 and a depending V-shaped leg 81 rigidly connected or secured to a common longitudinally extending connecting bar or beam 82 serving rigidly to connect the several lifting frames. Normally disposed below the carriage 54, the lifting frames 79 are positioned, when the carriage 54 is in its forward position, to pass upwardly through the carriage and surmounting platform and by engagement with the underside 83 of the overlying tray 26, lift the latter above the platform toward the offered surface 1 on the drum 3.

For lifting, raising or elevating the lifting frames 79 and therethrough the overlying loaded tray 26 and subsequently lowering them to normal position and in process returning the emptied tray to its position on the platform 68, there is here utilized as the drive means a hydraulic or other fluid-pressure actuated ram or jack 84, the piston rod 85 of which is secured at its upper end to the bar 82 connecting the lifting frames 79. Of a stroke and capacity to press the particular comestibles on the tray against the offered surface on the drum with a force or pressure sufficient to ensure their firm bonding or adherence to the surface and with the resilient pad 28 on the tray serving to distribute the pressure substantially equally among the comestibles, despite irregularities in shape, the hydraulic ram 84 preferably is driven by an individual hydraulic pump 86, the electric drive motor 87 for which includes in its wiring circuit 88 in series with the power source (not shown), a normally opening safety switch 89 closable by a tripping device or trip 90 attached to the carriage 54 as the latter reaches its forward position.

In the operation of the apparatus, each of the internally refrigerated surfaces 1 on the drum 3, as it approaches tray-confronting or comestible-attaching or loading position, here, its lowermost position, will carry, hold or have on it frozen comestibles from its previous loading, which were frozen as they were carried on the surface through the freezing zone 23, as well as an accumulation of frost in snow form. Both must be removed before a new load is applied, the frozen comestibles for delivery through a chute 91 in the drum frame 4 below the drum onto an underlying discharge belt or like conveyor 92 for discharge from the apparatus for glazing or other further treatment and the frost to eliminate an insulating layer between the surface and any of the new batch of unfrozen comestibles. The carriage 54 of the illustrated embodiment performs both functions as it advances under the offered surface 1 to its advanced or load-applying position, removal or detachment of the frozen comestibles by a rigid breaker bar 93 which, at the very low temperature to which the comestibles have been exposed, need only tap the comestibles at a point adjacent the surface 1 to break or disrupt their bond therewith and the latter, by one or a plurality of stiff brushes 94 of nylon or like wear-resistant material and of such stiffness as to brush off the accumulated frost without damage to the surface.

Transversely extending and of sufficient length or extent to encompass the width of the offered surface 1, both the breaker bar 93 and the brush or brushes 94 are mounted on a carrier plate 95 which in turn is mounted or supported on the front plate 65 of the carriage. With the breaker bar 93 and brushes 94 positioned during the advance stroke of the carriage 54 above the level of the associated tray 26 so that the bar will just clear and the brushes engage the offered surface 1, provision obviously must be made for lowering them at the outset of the retract or return movement or retreat of the carriage so that they will clear and not interfere with the batch of comestibles newly deposited on the surface. While the carrier plate 95 mounting the breaker bar 93 and brushes 94 might be moved straight up and down, it is preferred that the carrier plate move between its upper or normal and lower positions on an inclined or oblique plane by providing on the confronting sides of either or both of the front or base plate 65 on the carriage 54 and the carrier plate correspondingly inclined or oblique surfaces on which the carrier plate will slide or ride.

In the form illustrated in FIGURES 7–11 an inclination sufficient to encompass the required range of vertical movement, without undue inclination to interfere with return of the carrier plate to normal position or excessive prolongation of the inclined surface or surfaces and with stable support of the carrier plate, is obtained by mounting on the base plate 65 on the carriage toward either side a pair of upstanding, longitudinally aligned skids or rails 96 in stepped arrangement and having parallel, forwardly and downwardly inclined or sloping surfaces 97, on each of which slides or rides a correspondingly inclined or sloping face 98 of a shoe 99 depending or downstanding from the underside of the carrier plate, and locking the shoes against dislodgment to the skids by interlocking or interfitting flanges 100, one flange here being formed on each of the skids and an embracing pair on each of the shoes. Normally suitably held in its upper position against one or more stops 101 fixed to and upstanding from the carriage 54, as by a pair of return springs 102, one at either side and each anchored at its inner end to a stanchion 103 fixed to the carriage, the carrier plate is limited in its downward movement by two mating pairs of permanent magnets 104, one pair at either side, one magnet of each pair being fixed to the base plate 65 and the other to the carrier plate 95. Engagement of the mating magnets 104 at either side not only serves to limit the extent of downward movement of the carrier plate 95 relative to the carriage 54, but also is designed to hold the carrier plate in its lower or down position against the force of the springs 102.

Movement of the carriage 54 here is employed to supply the forces for moving the carrier plate 95 downwardly into magnet-engaging position at the outset of the return movement of the carriage and also to break the bond between the magnets as the carriage nears its normal position between the conveyor and drum frames 33 and 4. The first of these functions, that of forcing the carrier plate 95 downwardly, is here performed by the coaction of a pair of preferably angle-shaped actuating brackets or members 105, each secured, as by welding, to and upstanding from one of the main rails 55 and having a substantially vertical flange or leg 106 instanding toward the carriage and overlapping laterally or transversely and including within its vertical limits the range of vertical movement of horizontally directed stud or pin 107 fixed to and outstanding from the adjacent side of the carrier plate 95. Disposed slightly rearwardly of the associated stud 107 when the carriage 54 is in its forward position, each of the flanges 106 is slotted, as at 108, adjacent its upper extremity to pass the related stud on forward movement of the carriage. However, this slot 108 is one-way, made so by a flap 109 hinged to and overlapping the outer face 110 of the flange so as to yield on forward movement of the stud 107 but stop the latter's rearward movement. As a consequence, when the carriage begins its rearward movement, the carrier plate will move rearwardly with the carriage until the studs 107 engage the flaps 109, whereupon the continued and now relative rearward movement of the carriage will start the downward movement of the carrier plate 95 along its inclined plane. In process, the studs will move downwardly beyond the flaps 109 until they register with a pair of second or lower slots 111, one in each of the flanges 106, these second slots being either separate or, as here, formed as extensions of the first or upper slots 108. Could the magnetic attraction of the magnets 104 be depended on to pull the carrier plate 95 over an appreciable distance to its lower position, the lower slots 111 might be open. However, magnets of adequate power would be extremely difficult to disengage and it is therefore preferred to compromise by normally closing each of the lower slots by a flap 112 hinged to and overlapping the inner face 113 of each flange and yieldably held in slot-closing position against that face by loading means such as the illustrated holding spring 114 anchored at one end to the adjoining main rail 55 and at the other on the lower flap 112 through a lever arm 115 integral therewith, loading of the lower flaps being predetermined to force the carrier plate to complete its downward movement before the flaps will yield to pass the studs 107.

With the carrier plate 95 and its breaker bar 93 and brushes held in downward position on further rearward movement of the carriage 54 by the magnets 104, any disturbance of the batch of comestibles newly loaded on the offered surface 1 of the drum 3 is effectively prevented. Thereafter, once the carrier plate 95 has moved rearwardly beyond the drum 3 so that it need no longer be held down, release means come into play for disengaging or releasing the magnets 104 and enabling the return springs 102 to return or restore the carrier plate 95 to normal position preparatory to another phase under the drum 3. This release means here is in the form of a pair of levers 116, one at either side of the carriage and each pivoted on a mounting plate 117 secured to and upstanding from one of the main rails 55. Each of these levers is so mounted that, on actuation, its normally spring-retracted outwardly offset upper arm 118 will engage and act inwardly on the associated of the studs 105 with sufficient force to disengage the magnets 104. The remaining components of the illustrated release means are a pair of detents or fingers 119, one rigid with and outstanding from each side 57 of the carriage 54 and each adapted to pass the outer arm of the associated lever 116 due to the latter's outward offset but to engage the upper end of a second lever 120 pivoted to the mounting plate 117, the levers 116 and 120 being connected at their lower ends by a link 121 so that the force transmitted by the detents 119 to the second levers 120 will actuate the first levers 116 and disengage the magnets 104.

After one of its internally refrigerated surfaces 1 has been loaded with a batch of comestibles and the carriage has been withdrawn, the drum 3 is rotated sufficiently to bring the next of its surfaces into loading position, whereupon the cycle is repeated, in which a preloaded tray 25 from the food conveyor 31 is presented to the offered surface 1 by the carriage 54, the comestibles are applied to the surface by lifting of the tray by the lifting racks 79 and the empty tray is removed by return of the carriage to normal position. While the intermittent drive of the drum 3 by which its several surfaces 1 are sequentially offered is readily provided by an electric or other suitable drive motor 122, here mounted on the top cross piece 9 of one of the end members 10 of the drum frame 4 and drivably connected to the shaft 6 of the drum through suitable reduction gearing 123, the momentum developed by the drum, even during a partial rotation, is so great, due to its size, as to make it practically impossible to control the drive mechanism, such that each of the surfaces 1 can be stopped exactly in loading position and yet such stoppage is essential to effective loading. The problem is here solved by the use of stop or restraining means which not only positively stop the drum with one of its surfaces exactly in loading position, but cushion the stop so as to avoid a jolt sufficient to detach any comestibles from the surfaces on which they are being frozen.

In the form illustrated, the stop means for the drum is comprised of a lever or restraining arm 124 pivotally or swingably mounted at its inner end on the bearing-mounting upright 8 of one of the end members 10 of the drum frame 4. The arm 124 intermediate its ends is suspended by a spring 125 from the upper end of a post 126 mounted on the top cross piece 9 of the end member 10 and upstanding therefrom above the arm and, as its outer end portion, has a downwardly offset ledge or shelf 127 which, when the arm is forced downwardly, rests on an adjustable stop 128 surmounting the top cross piece 9. Also intermediate its ends, the lever arm 124 is attached by a link or links 129 to the upper end of a hydraulic piston 130 mounted below the arm on the top cross piece 9, conveniently having its reservoir 131 attached to the post 126 and adjustable in its cushioning action by suitable means such as a needle or other bleed valve (not shown). Reciprocably mounted on the shelf 127 of the arm 124 is a slide or stop plate or block 132 which normally is spring-held in extended position and is retractable by an electromagnet 133, of which its tailpiece 134 conveniently may form the core, to a position where a pair of slots, one 135 in the plate and the other 136 in the supporting shelf 127 are in register or alignment.

Cooperating with the lever arm 124 are a plurality of lugs 137 projecting or extending axially outwardly from the adjoining end 11 of the drum 3 and each fixed to that end at or, here, adjacent, and, in the direction of rotation of the drum, slightly to the rear of one of the several junctures 13 of the end's peripheral webs 14. Radially of the drum, the spacing of each of the lugs 137 relative to the arm 124 is such that when the arm is resting in downward position on the adjustable stop 127, a lug in engagement with the slide plate 132 will be in registry with the slot 136 in the shelf 127 but abut against a solid portion of the slide plate until the latter is retracted to bring the two slots 135 and 136 into register.

Constructed in the above manner, the arm 124 in the normal position of its slide plate 132 effectively will stop the drum in its intended rotation (counterclockwise as viewed in FIGURE 3) and, by adjustment of the adjustable stop 128 at the point at which one of the drum's surfaces 1 is exactly in loading position. Furthermore, after a particular lug 137 has been permitted to pass by momentary retraction of the slide plate 132, the arm 124, relieved of the driving force of the drum, will swing upwardly under force of the suspending spring 125 and present to the next of the lugs a closed or solid portion of the slide plate, the latter in the interim having returned to normal position. The suspending spring 125 and the piston 130 then come into play to cushion or soften, to the extent determined by the regulation of the piston, the next stoppage of rotation of the drum by engagement of the lever arm 124 with the adjustable stop 128.

While the restraining arm 124 is effective to stop or interrupt rotation of the drum 3 for each of its surfaces 1 at a point or position at which the offered surface is exactly in loading position, aligned with and parallel to the presented tray 26, and the inertia of the drum and its driving mechanism, once the drum is stopped, is sufficient to hold the offered surface in that position during the loading cycle, it is the rotation of the drum that brings it to that point. Conceivably, the drive motor 122 might be cut off in advance and the momentum of the drum depended on to carry the restraining arm 124 under force of the drum the rest of the way into engagement with the adjustable stop 128. However, this would require too fine a correlation between the control of the motor 122 and the adjustment of the opposing force on the arm 124 to be practical in a commercial embodiment of the apparatus. Consequently, it is essential, as a practical matter, that the drum be driven to the point of engagement of the arm 124 with the adjustable stop 128. The same problem is confronted in driving the carriage 54 since it, too, should be driven to the point of engagement of its front end plate 65 with the stop brackets 78 to ensure proper longitudinal alignment between the offered surface 1 of the drum and the tray 26 which it presents thereto. To permit such drive of the drum 3 and the carriage 54 without burning out their drive motors 122 and 64, a slip or fluid coupling or clutch 138 is interposed in the driving connection between each and its motor. A type of slip coupling suitable for both drives is that shown in section in FIGURE 13. Known as the Morse "torque-limiter," the illustrated coupling 138 mounts an otherwise free-running takeoff gear or sprocket 139 gripped by clutch facings 140 between a pair of clutch plates 141 splined to a drive shaft 142 geared to the motor 122, the pressure exerted by the clutch plates under force of an associated spring 143 being adjustable so that the gear will slip relative to the plates at a predetermined torque.

While the elevator 42 and associated pusher piston 50 by which empty trays are fed or driven onto the feed conveyor 31 may be controlled either together with or separately from the other operating components of the apparatus, the interrelation between the drum 3 and the carriage 54 dictates that their movements be synchronized, phased, or made to occur in timed sequence by an automatic or cyclic control. As exemplary of controls suitable for automatic control or automation of the movements of the drum and the carriage, there is here illustrated a cyclic control or sequence timer 144 of the cam type in which a plurality of appropriately cut or punched cams or cam plates 145 is mounted on a camshaft 146 rotated at a predetermined speed or rate by an adjustable timer 147 and utilizing suitable switches (not shown) having rollers or like contacts (not shown) riding on the peripheries of the cam for translating the irregular contours of the latter, as they rotate, into operating cycles of the several drive means, to each of which one of the switches is connected either directly or through interposed control means. The illustrated control has some six cams, one for controlling the operations of which together constitute the operating or loading cycle of the drum and related mechanisms. Thus, of the several illustrated cams 145, two control the direction in which the carriage 54 is driven by its drive motor 122, another two a solenoid-actuated reversing valve 148 for controlling lifting and lowering of the lifting frames 79 by the hydraulic ram 84, a fifth retraction of the slide plate 132 by energization of the associated electromagnet 133 for unlocking the drum 3, and the sixth rotation of the drum between loading positions.

Were control of the drives of the drum 3, carriage 54 and lifting racks 79 alone relied on for maintaining the relative movements of these mechanisms in synchronism or phase, the controlling cams would have to be extremely precise and even such precision would be of doubtful effect in the case of drive of the drum. However, by providing overriding controls in the form of the lever arm 124 and adjustable stop 127 and the stop brackets 78, serving as positive stops for determining the limits of advance of the drum 3 and carriage 54, respectively, and with the offered surface of the drum acting as a positive stop for the lifting frame 79, the control cams are required to control not the extent but only the sequence of the several operations with consequent reduction or leeway in the preciseness of the cams. Also the precision required in the associated cams for controlling the raising and lowering of the lifting frames 79 is further reduced by the provision in the circuit of the pump motor 87 in series with the master switch 149 through which both the pump motor and the cyclic control 144 are connected to the power source (not shown), of the safety switch 89 by which actuation of the pump motor and thus the lifting frames is positively prevented except when the carriage 54 is in loading position. Not only do these overriding or safety controls, including the safety switch 89 for the lifting frames, as well as the positive stops for the drum and carriage, enable the control cams to be relatively imprecise, but they ensure that once in synchronism or phase, the movements of these components will remain so and that if, for any reason such as manual handling during repair or inspection, one of these components gets out of phase, it will return to phase in the next cycle.

Assuming the carriage 54 is in its normal position and carrying a loaded tray 26, on closing of the master switch 149, the cyclic and overriding controls will first cause the carriage to advance under the offered surface 1 of the drum 3 to its advanced position against the stop brackets 78, in process detaching the previous load of now-frozen comestibles and removing any accumulated frost from the offered surface 1 of the drum. Next, the lifting frames will lift the loaded tray 26 to press the comestibles thereon against the offered surface 1 with sufficient force to freeze them thereto, after which the frames will lower, in process restoring the tray, now empty, to the platform 67 on the carriage 53. Thereafter, in sequence, the carriage will retreat to normal position, the slide plate 132 retract to unlock the drum and the drum rotate to bring the succeeding or next surface into loading position. With the trays 26 tripped on return of the carriage 54 to normal position onto the return conveyor 38 and, through the intervening elevator 42 and pusher piston 50, fed into the loading zone 30 and therefrom back onto the carriage 54, the operating cycle of the carriage, lifting frames and drum will continue to be repeated so long as the apparatus is in operation. Both the time of the operating cycle and the total time in which a comestible is subjected to freezing in the freezing chamber 23 may be varied to suit the particular comestible being frozen. Applied to the freezing of shrimp and with a six-sided drum such as that illustrated, an operating cycle repeated about once a minute, with the total time to which each batch is subjected to freezing thus approximately six minutes, has been found both to produce thorough freezing and to be within the loading rate obtainable even by manual loading.

From the above detailed description, it will be apparent that there has been provided improved apparatus for quick-freezing comestibles which automatically loads and unloads comestibles from an internally refrigerated surface, carries the comestibles on that surface through a refrigerating chamber in which they are frozen and freezes them under such conditions as to minimize loss in both quality and weight due to dehydration. It should be understood that the described and disclosed embodiment is merely exemplary of the invention and that all modifications are intended to be included which do not depart from either the spirit of the invention or the scope of the appended claims.

Having described my invention, I claim:

1. Apparatus for individually freezing comestibles comprising an internally refrigerated surface movably mounted in an insulated refrigerating chamber, means for applying comestibles to said surface at a pressure which at the temperature of said surface causes said comestibles on application to adhere individually thereto, means for moving said surface in said chamber without relative movement between said surface and the applied comestibles for freezing said comestibles, and means for detaching the applied comestibles after freezing from said surface.

2. Apparatus for individually freezing comestibles comprising a drum rotatably mounted in an externally refrigerated freezing chamber, an internally refrigerated surface on said drum, movable means for applying comestibles to said surface at a pressure which at the temperature of said surface causes said comestibles on application to adhere individually thereto, means for rotating said drum and moving said surface with the applied comestibles in said chamber for freezing said comestibles, and means for detaching said applied comestibles after freezing from said surface.

3. Apparatus for individually freezing comestibles comprising an internally refrigerated surface movably mounted in an insulated refrigerating chamber, and automatic means for sequentially applying comestibles to said surface at a pressure which at the temperature of said surface causes said comestibles on application to adhere individually thereto, moving said surface and therewith the applied comestibles in said freezing chamber, and removing said applied comestibles after freezing from said surface.

4. Apparatus for individually freezing comestibles comprising a drum rotatably mounted in an externally refrigerated freezing chamber, an internally refrigerated surface on said drum, movable means for applying comestibles to said surface at a pressure which at the temperature of said surface causes said comestibles on application to adhere individually thereto, means for rotating said drum and moving said surface with the applied comestibles in said chamber for freezing said comestibles, means for detaching said applied comestibles after freezing from said surface, and cyclic control means for operating said applying, moving and detaching means automatically in timed sequence.

5. Apparatus for individually freezing comestibles comprising an insulated casing confining a chamber containing a gaseous medium, means including an internally refrigerated surface movably mounted in said chamber for refrigerating said medium, and automatic means for sequentially applying comestibles to said surface at a pressure which at the temperature of said surface causes said comestibles on application to adhere individually thereto, moving said surface and therewith the applied comestibles in said freezing chamber, and removing said applied comestibles after freezing from said surface.

6. Apparatus for individually freezing comestibles comprising an insulated casing confining a chamber containing substantially still air, means including an internally refrigerated surface movably mounted in said chamber for refrigerating said air, and automatic means for sequentially applying comestibles to said surface at a pressure which at the temperature of said surface causes said comestibles on application to adhere individually thereto, moving said surface and therewith the applied comestibles in said freezing chamber, and removing said applied comestibles after freezing from said surface.

7. Apparatus for individually freezing comestibles comprising an insulated casing confining a refrigerating chamber, a drum rotatably mounted in said chamber, an internally refrigerated flat surface on a side of said drum, means movable relative to said drum for presenting a batch of comestibles to said surface in a loading position thereof, means for applying said batch to said surface at a pressure which at the temperature of said surface causes the comestibles on application to adhere individually thereto, means for rotating said drum and moving said surface with the applied comestibles in said chamber, and means for detaching said applied comestibles after freezing from said surface.

8. Apparatus for individually freezing comestibles comprising an insulated casing confining a refrigerating chamber, a drum rotatably mounted in said chamber, an internally refrigerated flat surface on a side of said drum, means movable relative to said drum for presenting a batch of comestibles to said surface in a loading position thereof, means for applying said batch to said surface at a pressure which at the temperature of said surface causes the comestibles on application to adhere individually thereto, means for rotating said drum and moving said surface with the applied comestibles in said chamber, and means operative on return of said surface to said loading position for detaching said applied comestibles after freezing from said surface.

9. Apparatus for individually freezing comestibles comprising an insulated casing confining a refrigerating chamber, a drum rotatably mounted in said chamber, an internally refrigerated flat surface on a side of said drum, means movable relative to said drum for presenting a batch of comestibles to said surface in a loading position thereof, means for applying said batch to said surface at a pressure which at the temperature of said surface causes the comestibles on application to adhere individually thereto, means for rotating said drum and moving said surface with the applied comestibles in said chamber, and means carried by said presenting means and operative on return of said surface to said loading position for detaching said applied comestibles after freezing from said surface.

10. Apparatus for individually freezing comestibles comprising an insulated casing confining a refrigerating chamber, a drum rotatably mounted in said chamber, an internally refrigerated flat surface on a side of said drum, means movable relative to said drum for presenting a batch of comestibles to said surface in a loading position thereof, means for applying said batch to said surface at a pressure which at the temperature of said surface causes the comestibles on application to adhere individually thereto, means for rotating said drum and moving said surface with the applied comestibles in said chamber, means operative on return of said surface to said loading position for detaching said applied comestibles after freezing from said surface, and cyclic control means for operating said presenting, applying, rotating and detaching means automatically in timed sequence.

11. Apparatus for individually freezing comestibles comprising an insulated casing confining a refrigerating chamber, a drum rotatably mounted in said chamber, an internally refrigerated flat surface on a side of said drum, means movable relative to said drum for presenting a batch of comestibles to said surface in a loading position thereof, means for applying said batch to said surface at a pressure which at the temperature of said surface causes the comestibles on application to adhere individually thereto, means for rotating said drum and moving said surface with the applied comestibles in said chamber, means carried by said presenting means and operative on return of said surface to said loading position for detaching said applied comestibles after freezing from said surface, cyclic control means for operating said presenting, applying, rotating and detaching means automatically in timed sequence, and means cooperating with said cyclic control means for maintaining said presenting, applying, rotating and attaching means in phase during said automatic operation thereof.

12. Apparatus for individually freezing comestibles comprising an insulated casing confining a refrigerating chamber, a drum rotatably mounted in said chamber, an internally refrigerated flat surface on a side of said drum, means movable relative to said drum for presenting a batch of comestibles to said surface in a loading position thereof, means for applying said batch to said surface at a pressure which at the temperature of said surface causes the comestibles on application to adhere individually thereto, means for rotating said drum and moving said surface with the applied comestibles in said chamber, releasable means for stopping rotation of said drum at a point at which said surface is in said loading position, means carried by said presenting means and operative on return of said surface to said loading position for detaching said applied comestibles after freezing from said surface, and cyclic control means for operating said presenting, applying, rotating, releasing and detaching means automatically in timed sequence.

13. Apparatus for individually freezing comestibles comprising a multi-sided drum rotatably mounted in an insulated refrigerating chamber, an internally refrigerated outer surface on each side of said drum, means for rotating said drum and successively offering said surfaces for loading in a loading position, a carriage reciprocable axially of said drum for presenting in advanced position a batch of comestibles in spaced relation to an offered surface in said loading position, means for applying said batch to said offered surface at a pressure which at the temperature of said surface causes said comestibles on application to adhere individually thereto, and means carried by said carriage for detaching frozen comestibles of a previously loaded batch from the offered surface as said carriage advances to said advanced position.

14. Apparatus for individually freezing comestibles comprising a multi-sided drum rotatably mounted in an insulated refrigerating chamber, an internally refrigerated outer surface on each side of said drum, means for rotating said drum and successively offering said surfaces for loading in a loading position, a carriage reciprocable axially of said drum for presenting in advanced position a batch of comestibles in spaced relation to an offered surface in said loading position, means for applying said batch to said offered surface at a pressure which at the temperature of said surface causes said comestibles on application to adhere individually thereto, means carried by said carriage for detaching frozen comestibles of a previously loaded batch from the offered surface as said carriage advances to said advanced position, and means for moving and holding said detaching means clear of the comestibles applied to the offered surface on retreat of said carriage from said advanced position.

15. Apparatus for individually freezing comestibles comprising a multi-sided drum rotatably mounted in an insulated refrigerating chamber, an internally refrigerated outer surface on each side of said drum, means for rotating said drum and successively offering said surfaces for loading in a loading position, a carriage reciprocable axially of said drum for presenting in advanced position a batch of comestibles in spaced relation to an offered surface in said loading position, means for applying said batch to said offered surface at a pressure at which at the temperature of said surface causes said comestibles on application to adhere individually thereto, a carrier plate mounted at a front of said carriage and mounting breaker means and brush means, said breaker and brush means in a normal position of said carrier plate being operative on advance of said carriage to advanced position respectively to detach frozen comestibles from a previously loaded batch and brush off any accumulated frost from the offered surface, and means for moving said carrier plate and therethrough said breaker and brush means away from said drum to clear the applied comestibles on retreat of said carriage from said advanced position.

16. Apparatus for individually freezing comestibles comprising a multi-sided drum rotatably mounted in an insulated refrigerated chamber, an internally refrigerated outer surface on each side of said drum, means for rotating said drum and successively offering said surfaces for loading in a loading position, a carriage reciprocable axially of said drum for presenting in advanced position a batch of comestibles in spaced relation to an offered surface in said loading position, means for applying said batch to said offered surface at a pressure which at the temperature of said surface causes said comestibles on application to adhere individually thereto, a carrier plate mounted at a front of said carriage for sliding at an incline relative thereto, breaker and brush means mounted on said carrier plate and disposed on advance of said carriage and with said carrier plate in a normal position respectively to detach frozen comestibles of a previously applied batch and brush off accumulated frost from said offered surface, one-way means effective as said carriage retreats from advanced position to force said carrier plate on said incline to a position removed from said offered surface and clear said breaker and brush means from the batch of comestibles applied thereto, magnetic means for holding said carrier plate in said removed position during further retraction of said carriage, and lever means effective as said carriage approaches retracted position for restoring said carrier plate to normal position.

17. Apparatus for individually freezing comestibles comprising a multi-sided drum rotatably mounted in an insulated refrigerating chamber, an internally refrigerated outer surface on each side of said drum, means for rotating said drum and successively offering said surfaces for loading in a loading position, a carriage reciprocable axially of said drum for presenting in advanced position a batch of comestibles in spaced relation to an offered surface in said loading position, means for applying said batch to said offered surface at a pressure which at the temperature of said surface causes said comestibles on application to adhere individually thereto, a carrier plate mounted at a front of said carriage for sliding at an incline relative thereto, breaker and brush means mounted on said carrier plate and disposed on advance of said carriage and with said carrier plate in a normal position respectively to detach frozen comestibles of a previously applied batch and brush off accumulated frost from said offered surface, one-way means fixed to a frame supporting said drum and engageable with means fixed to and projecting from said carrier plate as said carriage is retracted from said advanced position for forcing said carrier plate on said incline to a position removed from said offered surface and clearing said breaker and brush means from the batch of comestibles applied thereto, magnetic means for holding said carrier plate in said removed position during further retraction of said carriage, and lever means mounted on said frame and disposed to engage and act on said projecting means as said carriage approaches retracted position for breaking the hold of said magnetic means and enabling a restoring spring to restore said carrier plate to normal position.

18. Apparatus for individually freezing comestibles comprising a multi-sided drum rotatably mounted in an insulated refrigerating chamber, an internally refrigerated outer surface on each side of said drum, means for rotating said drum and successively offering said surfaces for loading in a loading position, a carriage, a plurality of trays each preloadable with a batch of comestibles at a loading station outside said casing and successively feedable in loaded condition onto said carriage, said carriage being reciprocable axially of said drum and in advanced position presenting in spaced relation to an offered surface in the loading position thereof a batch of comestibles loaded on one of said trays, and lifting means shiftable upwardly through said carriage in the advanced position thereof to pass therethrough and lift said tray therefrom to a position to apply the batch thereon to said offered surface at a pressure which at the temperature of said surface causes said comestibles on application individually to adhere thereto.

19. Apparatus for individually freezing comestibles comprising a multi-sided drum rotatably mounted in an insulated refrigerating chamber, an internally refrigerated outer surface on each side of said drum, means for rotating said drum and successively offering said surfaces for loading in a loading position, a carriage reciprocable axially of said drum for presenting in advanced position a batch of comestibles in spaced relation to an offered surface in said loading position, means for applying said batch to said offered surface at a pressure which at the temperature of said surface causes said comestibles on application to adhere individually thereto, a carrier plate mounted at a front of said carriage for sliding at an incline relative thereto, breaker and brush means mounted on said carrier plate and disposed on advance of said carriage and with said carrier plate in a normal position respectively to detach frozen comestibles of a previously applied batch and brush off accumulated frost from said offered surface, one-way means fixed to a frame supporting said drum and engageable with means fixed to and projecting from said carrier plate as said carriage is retracted from said advanced position for forcing said carrier plate on said incline to a position removed from said offered surface and clearing said breaker and brush means from the batch of comestibles applied thereto, magnetic means for holding said carrier plate in said removed position during further retraction of said carriage, lever means mounted on said frame and disposed to engage and act on said projecting means as said carriage approaches retracted position for breaking the hold of said magnetic means and enabling a restoring spring to restore said carrier plate to normal position, and a resilient pad on each of said trays for resiliently supporting comestibles thereon and distributing among said comestibles the pressure applied by said lifting means to said tray.

20. Apparatus for individually freezing comestibles comprising an insulated casing enclosing a refrigerating chamber, a multi-sided drum rotatably mounted on a supporting frame in said chamber, an internally refrigerated outer surface at each side of said drum, means for rotating said drum and successively offering said surfaces for loading in a loading position, a feed conveyor outside said casing, a trackway extending below said drum through an opening in said casing between said feed conveyor and a far end of said drum frame, a carriage reciprocably rollable on said trackway for delivering comestibles from said feed conveyor to an offered surface of said drum in said loaded position, stop means carried by said drum frame for determining the advanced position of said carriage beneath said drum, and a reversible drive motor for driving said carriage between said advanced position and a normal position intermediate said drum and feed conveyor.

21. Apparatus for individually freezing comestibles comprising an insulated casing enclosing a refrigerating chamber, a multi-sided drum rotatably mounted on a supporting frame in said chamber, an internally refrigerated outer surface at each side of said drum, means for rotating said drum and successively offering said surfaces for loading in a loading position, a feed conveyor outside said casing, a trackway extending below said drum through an opening in said casing between said feed conveyor and a far end of said drum frame, a carriage reciprocably rollable on said trackway for delivering comestibles from said feed conveyor to an offered surface of said drum in said loading position, stop means carried by said drum frame for determining the advanced position of said carriage beneath said drum, a reversible drive motor for driving said carriage between said advanced position and a normal position intermediate said drum and feed conveyor, and a coupling in the driving connection between said drive motor and carriage and slippable at a predetermined torque for enabling said drive motor to drive said carriage positively against said stop means.

22. Apparatus for individually freezing comestibles comprising an insulated casing enclosing a refrigerating chamber, a multi-sided drum rotatably mounted on a supporting frame in said chamber, an internally refrigerated outer surface at each side of said drum, means for rotating said drum and successively offering said surfaces for loading in a loading position, a feed conveyor outside said casing, a trackway extending below said drum through an opening in said casing between said feed conveyor and a far end of said drum frame, a carriage reciprocably rollable on said trackway between an advanced position beneath said drum and a normal position intermediate said drum and feed conveyor, a normally horizontally disposed platform mounted on said carriage and tiltable rearwardly relative thereto on a transverse axis, a plurality of trays each loadable with a batch of comestibles and selectively feedable onto said platform for presentation to an offered surface of said drum on movement of said carriage to advanced position, fixed stop means carried by said drum frame and engageable with a front end of said carriage for determining said advanced position thereof, a reversible slip coupling drive for driving said carriage between said advanced and normal positions, and a return conveyor underlying said feed conveyor and accessible to an empty tray returned by said carriage from said drum on tilting of said platform for returning the empty trays for loading to said feed conveyor.

23. Apparatus for individually freezing comestibles comprising an insulated casing enclosing a refrigerating chamber, a multi-sided drum rotatably mounted on a supporting frame in said chamber, an internally refrigerated outer surface at each side of said drum, means for rotating said drum and successively offering said surfaces for loading in a loading position, a feed conveyor outside said casing, a trackway extending below said drum through an opening in said casing between said feed conveyor and a far end of said drum frame, a carriage reciprocably rollable on said trackway between an advanced position beneath said drum and a normal position intermediate said drum and feed conveyor, a normally horizontally disposed platform mounted on said carriage and tiltable rearwardly relative thereto on a transverse axis, a plurality of trays each loadable with a batch of comestibles and selectively feedable onto said platform for presentation to an offered surface of said drum on movement of said carriage to advanced position, fixed stop means carried by said drum frame and engageable with a front end of said carriage for determining said advanced position thereof, a reversible slip coupling drive for driving said carriage between said advanced and normal positions, a return conveyor underlying said feed conveyor and accessible to an empty tray returned by said carriage from said drum on tilting of said platform for returning the empty trays for loading to said feed conveyor, means at an outlet end of said return conveyor for elevating an empty tray to the level of said feed conveyor, pusher means disposed to push a tray from said elevating means in the elevated position thereof toward said feed conveyor, and drive means engageable with said tray on pushing thereof by said pusher means for driving said tray onto said feed conveyor.

24. Apparatus for individually freezing comestibles comprising an insulated casing enclosing a refrigerating chamber, a multi-sided drum rotatably mounted on a supporting frame in said chamber, an internally refrigerated outer surface at each side of said drum, means for rotating said drum and successively offering said surfaces for loading in a loading position, a feed conveyor outside said casing, a trackway extending below said drum through an opening in said casing between said feed conveyor and a far end of said drum frame, a carriage reciprocably rollable on said trackway between an advanced position beneath said drum and a normal position intermediate said drum and feed conveyor, a normally horizontally disposed platform mounted on said carriage and tiltable rearwardly relative thereto on a transverse axis, a plurality of trays each loadable with a batch of comestibles and selectively feedable onto said platform for presentation to an offered surface of said drum on movement of said carriage to advanced position, fixed stop means carried by said drum frame and engageable with a front end of said carriage for determining said advanced position thereof, a reversible slip coupling drive for driving said carriage between said advanced and normal position, a return conveyor underlying said feed conveyor and accessible to an empty tray returned by said carriage from said drum on tilting of said platform for returning the empty trays for loading to said feed conveyor, means at an outlet end of said return conveyor for elevating an empty tray to the level of said feed conveyor, normally retracted pusher means synchronized in action with said elevating means and operable on elevating thereby of an empty tray to push said tray from said elevating means in the elevated position thereof toward said feed conveyor, and drive means engageable with said tray on pushing thereof by said pusher means for driving said tray onto said feed conveyor.

25. Apparatus for individually freezing comestibles comprising an insulated casing enclosing a refrigerating chamber, a multi-sided drum rotatably mounted on a supporting frame in said chamber, an internally refrigerated outer surface at each side of said drum, means for rotating said drum and successively offering said surfaces for loading in a loading position, a feed conveyor outside said casing, a trackway extending below said drum through an opening in said casing between said feed conveyor and a far end of said drum frame, a carriage reciprocably rollable on said trackway between an advanced position beneath said drum and a normal position intermediate said drum and feed conveyor, a normally horizontally disposed platform mounted on said carriage and tiltable rearwardly relative thereto on a transverse axis, a plurality of trays each loadable with a batch of comestibles and selectively feedable onto said platform for presentation to an offered surface of said drum on movement of said carriage to advanced position, fixed stop means carried by said drum frame and engageable with a front end of said carriage for determining said advanced position thereof, a reversible slip coupling drive for driving said carriage between said advanced and normal position, a return conveyor underlying said feed conveyor and accessible to an empty tray returned by said carriage from said drum on tilting of said platform for returning the empty trays for loading to said feed conveyor, and means overlying said return conveyor for sterilizing said empty trays prior to return thereof to said feed conveyor.

26. Apparatus for individually freezing comestibles comprising an insulated freezing chamber, a drum rotatably mounted on a frame in said chamber, an internally refrigerated substantially flat surface on a side of said drum, drive means for rotating said drum, an arm swingably mounted on said frame, an adjustable stop on said frame below and engageable with said arm for adjustably determining the lower limit of the swing thereof, yieldable means normally holding said arm above said stop, lug means projecting axially from an adjoining end of said drum, a slide plate carried by and retractable longitudinally of said arm, said plate axially overlapping and in normal position presenting a solid surface to said lug means for blocking passage thereof therepast, slots in said plate and arm and alignable with each other and said lug means on retraction of said plate for passing said lug means, and drive means for rotating said drum, said arm when in its upper position initially engaging said lug means by said slide plate and through said yieldable means yieldably resisting rotation of said drum to the point of stoppage thereof by engagement of said arm with said adjustable stop predetermined by the adjustment of said stop and thereafter on retraction of said plate releasing said drum for further rotation.

27. Apparatus for individually freezing comestibles comprising an insulated freezing chamber, a drum rotatably mounted on a stand in said chamber, an internally refrigerated substantially flat surface on a side of said drum, drive means for rotating said drum, an arm swingably mounted on said stand, an adjustable stop on said stand below and engageable with said arm for adjustably determining the lower limit of the swing thereof, spring means normally holding said arm above said stop, an adjustable bleed piston mounted on said stand below and connected to said arm for imposing a predetermined resistance to downward swinging thereof, lug means projecting axially from an adjoining end of said drum, a slide plate carried by and retractable longitudinally of said arm, said plate axially overlapping and in normal position presenting a solid surface to said lug means for blocking passage thereof therepast, slots in said plate and arm and alignable with each other and said lug means on retraction of said plate for passing said lug means, and drive means for rotating said drum, said arm when in its upper position initially engaging said lug means by said slide plate, through said spring and piston means yieldably resisting rotation of said drum to the point of stoppage thereof by engagement of said arm with said adjustable stop predetermined by the adjustment of said stop and thereafter on retraction of said plate releasing said drum for further rotation.

28. Apparatus for individually freezing comestibles comprising an insulated freezing chamber, a drum rotatably mounted on a frame in said chamber, an internally refrigerated substantially flat surface on a side of said drum, a drive motor for rotating said drum, an arm swingably mounted on said frame, an adjustable stop on said frame below and engageable with said arm for adjustably determining a lower limit of the swing thereof, yieldable means normally holding said arm above said stop, lug means projecting axially from an adjoining end of said drum, a slide plate carried by and retractable longitudinally of said arm, said plate axially overlapping and in normal position presenting a solid surface to said lug means for blocking passage thereof therepast, slots in said plate and arm and alignable with each other and said lug means on retraction of said plate for passing said lug means, drive means for rotating said drum, said arm when in its upper position initially engaging said lug means by said slide plate and through said yieldable means yieldably resisting rotation of said drum to the point of stoppage thereof by engagement of said arm with said adjustable stop predetermined by the adjustment of said stop and thereafter on retraction of said plate releasing said drum for further rotation, and a coupling interposed in the driving connection between said motor and drum and slipping at a predetermined torque for enabling said arm to be positively driven by said lug means into engagement with said adjustable stop.

29. Apparatus for individually freezing comestibles comprising an insulated refrigerating chamber, a multisided drum rotatably mounted in said chamber, an internally refrigerated surface at each side of said drum, means for rotating said drum and successively offering said surfaces for loading in a loading position, a carriage below and shiftable axially of said drum for presenting to an offered surface thereof and in spaced relation thereto a batch of comestibles loaded on a tray carried by said carriage, fixed stop means carried by a frame of said drum engageable with a front end of said carriage for determining the advanced position thereof, lifting means elevatable upwardly through said carriage in said advanced position thereof for lifting said tray thereoff and pressing said comestibles on said tray against said offered surface at a pressure which at the temperature of said surface causes said comestibles on application to adhere individually thereto, means for actuating said lifting means, and a normally open safety switch in the circuit of said actuating means and closable by said carriage on reaching its advanced position for preventing actuation of said lifting means except when said carriage is in said position.

30. Apparatus for individually freezing comestibles comprising an insulated casing confining a chamber containing substantially still air, a drum rotatably mounted in said chamber, an internally refrigerated surface on a side of said drum, cooling means stationarily mounted in said chamber and cooperating with said surface for maintaining said air at a temperature within the range at which any moisture condensing from said air will condense as snow, means for applying comestibles to said surface at a pressure which at the temperature of said surface causes said comestibles on application to adhere individually thereto, means for rotating said drum and moving said surface with the applied comestibles in said chamber, and means for removing said comestibles after freezing and any accumulated frost from said surface.

31. Apparatus for individually freezing comestibles comprising an insulated casing confining a chamber containing substantially still air, a drum rotatably mounted in said chamber, an internally refrigerated surface on a side of said drum, said surface being at a temperature to maintain said air in a temperature range within which any moisture condensing therefrom will condense as snow, means for applying comestibles to said surface at a pressure which at the temperature of said surface causes said comestibles on application to adhere individually thereto, means for rotating said drum and moving said surface with the applied comestibles in said chamber, and means for removing said comestibles after freezing and any accumulated frost from said surface.

32. Apparatus for individually freezing comestibles comprising an insulated casing confining a chamber containing substantially still air refrigerated to a temperature range within which any moisture therein will condense as snow, a multisided drum rotatably mounted in said chamber, an internally refrigerated substantially flat surface at each side of said drum, stop means for stopping rotation of said drum at points at which its surfaces are each offered for loading in a predetermined loading position, a carriage advanceable and retractable axially of said drum through an opening in said casing for presenting in advanced position a batch of comestibles in spaced relation to the surface in loading position, fixed stop means for stopping said carriage in said advanced position, drive means including a slip coupling for positively driving each of said drum and carriage against their respective stop means, lifting means for lifting a tray loaded with comestibles from said carriage and applying said comestibles to the confronting surface at a pressure which at the temperature of said surface causes said comestibles on application to adhere individually thereto, safety means actuated by said carriage for preventing actuation of said lifting means except when said carriage is in advanced position, and cycle control means for automatically operating said drum, carriage and lifting means in timed sequence under the overriding control of said stop and safety means.

33. Apparatus for individually freezing comestibles comprising an insulated freezing chamber, a drum rotatably mounted on a frame in said chamber, an internally refrigerated substantially flat surface on a side of said drum, drive means for rotating said drum, and restraining means mounted on said frame and engageable with means on said drum for yieldably resisting rotation of said drum by said drive means and stopping said rotation at a point at which said surface is in a predetermined loading position and thereafter releasing said drum for further rotation.

References Cited in the file of this patent

UNITED STATES PATENTS

| | | |
|---|---|---|
| 2,284,270 | Eberts et al. | May 26, 1942 |
| 2,697,463 | Desrosier | Dec. 21, 1954 |